(12) United States Patent
Wilhelm et al.

(10) Patent No.: US 10,670,158 B2
(45) Date of Patent: Jun. 2, 2020

(54) DIRECTIONAL VALVE, ESPECIALLY FOR BREATHING GASES, AND METHOD FOR MANUFACTURING SAME

(71) Applicant: Dräger Safety AG & Co. KGaA, Lübeck (DE)

(72) Inventors: Christian Wilhelm, Lübeck (DE); Stefan Effmann, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 134 days.

(21) Appl. No.: 15/715,651

(22) Filed: Sep. 26, 2017

(65) Prior Publication Data

US 2018/0087680 A1    Mar. 29, 2018

(30) Foreign Application Priority Data

Sep. 27, 2016  (DE) .................. 10 2016 011 597

(51) Int. Cl.
| | |
|---|---|
| *F16K 15/03* | (2006.01) |
| *F16K 15/14* | (2006.01) |
| *A62B 18/10* | (2006.01) |
| *F16K 27/02* | (2006.01) |

(52) U.S. Cl.
CPC ............ *F16K 15/145* (2013.01); *A62B 18/10* (2013.01); *F16K 15/031* (2013.01); *F16K 15/035* (2013.01); *F16K 27/0209* (2013.01)

(58) Field of Classification Search
CPC .... F16K 15/031; F16K 15/035; F16K 15/145; F16K 15/16; F16K 17/34
USPC ........ 137/315.07, 512.1, 512.15; 138/43, 45, 138/46
See application file for complete search history.

(56) References Cited

U.S. PATENT DOCUMENTS

| | | | |
|---|---|---|---|
| 1,800,066 A | | 4/1931 | Glass |
| 2,897,835 A | * | 8/1959 | Philippe ................ F16K 15/147 137/218 |
| 7,302,962 B2 | * | 12/2007 | Blake, III .............. B60H 1/249 137/15.18 |

(Continued)

FOREIGN PATENT DOCUMENTS

| | | |
|---|---|---|
| DE | 705 553 C | 5/1941 |
| DE | 10 27 518 B | 4/1958 |

(Continued)

OTHER PUBLICATIONS

Original and Translation of FR 2408780; Bisa Karl; Jun. 8, 1979.*

*Primary Examiner* — Mary E McManmon
*Assistant Examiner* — Paul J Gray
(74) *Attorney, Agent, or Firm* — McGlew and Tuttle, P.C.

(57) ABSTRACT

A directional valve (10) includes a valve housing (12), a plurality of valve flaps (16-18), which can be moved by a gas stream or by a flowing medium and are arranged at the edge, and a number of support surfaces (20-22) as a valve seat. A number of support surfaces (20-22) corresponds to a number of valve flaps (16-18). Each valve flap (16-18) is adapted to a surface of a respective support surface (20-22). The support surfaces (20-22) are sloped in relation to a cross-sectional surface through the valve housing (12). The support surfaces (20-22) together form a tip pointing in the flow direction of the directional valve (10). A method for manufacturing such a directional valve (10) is provided including method features relating to the use of such a directional valve (10).

12 Claims, 5 Drawing Sheets

(56) References Cited

U.S. PATENT DOCUMENTS 8,167,002 B2 * 5/2012 Kuhne .................. G05D 7/012
137/504

FOREIGN PATENT DOCUMENTS

| | | |
|---|---|---|
| DE | 27 50 912 A1 | 5/1979 |
| DE | 10 2010 005 116 A1 | 7/2011 |
| DE | 10 2010 008 923 A1 | 8/2011 |
| JP | S58-165 372 U | 11/1983 |
| WO | 2012/010815 A1 | 1/2012 |

* cited by examiner

DIRECTIONAL VALVE, ESPECIALLY FOR BREATHING GASES, AND METHOD FOR MANUFACTURING SAME

CROSS REFERENCE TO RELATED APPLICATIONS

This application claims the benefit of priority under 35 U.S.C. § 119 of German Application 10 2016 011 597.1, filed Sep. 27, 2016, the entire contents of which are incorporated herein by reference.

FIELD OF THE INVENTION

The present invention pertains to a directional valve, especially to a directional valve for breathing gases, for example, a directional valve acting as an exhalation valve of a breathing mask or a directional valve of a closed-circuit respirator or of a closed-circuit diving apparatus, which directional valve acts as an inhalation valve or exhalation valve. Such and other devices will hereinafter generally be called respirators. The present invention further correspondingly also pertains to such a device with at least one directional valve, i.e., for example, a closed-circuit respirator, a closed-circuit diving apparatus or a medical device, and finally to a method for manufacturing (installing) a directional valve.

BACKGROUND OF THE INVENTION

Directional valves are known per se; they allow the flow of a particular medium, for example, a gas stream, in a flow direction determined by the design of the directional valve, and block the flow of the particular medium if the flow arrives against the flow direction.

A directional valve acting as an exhalation valve of a breathing mask is known from DE 1 027 518 A. This directional valve comprises a valve lower part with a valve seat and with a centrally held closing element. It was observed at that time as a drawback of prior-art exhalation valves that the pressure difference, which is to be overcome during the exhalation, increases approximately proportionally with the flow velocity and hence also with the quantity of air exhaled per unit of time. This causes the exhalation resistance to increase excessively in a physiologically unfavorable manner during hard work and consequently deep breathing. An elastically deformable, frustoconical closing element was proposed at that time to avoid this drawback. It should, however, be noted in connection with this solution that only a part of the cross-sectional area is released by the closing element in the flow direction and that if such a directional valve is placed in a tube, for example, an exhalation tube, the gas stream through the closing element is deflected towards the tube wall, which results in an unfavorably increased flow resistance.

Further directional valves with elastically deformable closing elements have meanwhile become known.

For example, DE 10 2010 008 923 A shows a directional valve, in which two elastic flaps arranged at the edge in a valve housing act as the closing element and a middle web on the valve housing and support webs arranged on both sides in relation thereto act as a valve seat.

A directional valve, which opens and closes according to the principle of a heart valve, is known from WO 2012/010815 A1. It has, however, the drawback that the individual valve parts cannot be laid down on a support geometry, so that the valve parts may turn over under an increased back pressure and the valve will consequently fail to close correctly. In addition, the individual valve parts must be manufactured with extremely high precision in order to make it possible to guarantee tightness in the blocked direction under usual pressure conditions.

SUMMARY OF THE INVENTION

One object of the present invention is to provide a directional valve that is improved compared to the state of the art, especially a directional valve, having a flow resistance that is largely independent of the opening state and which permits a favorable routing of the gas stream through the directional valve.

This object is accomplished by a directional valve according to the invention comprising a valve housing and a plurality of valve flaps, which can be moved by a flowing medium and are arranged at an edge of the valve. A plurality of support surfaces are provided defining a valve seat. A number of the support surfaces corresponds to a number of the valve flaps. Each valve flap is adapted to a surface of a respective support surface and the support surfaces are sloped in relation to a cross-sectional surface through the valve housing. The support surfaces together form a tip pointing in a flow direction of the directional valve.

Each support surface may be defined at an edge by an associated respective web that is common to an adjacent support surface. All such webs meet in the area of a central longitudinal axis of the directional valve and the point at which they meet forms a most extended point of the tip pointing in the flow direction of the directional valve.

Such a directional valve preferably has a cylindrical valve housing, a plurality of valve flaps, which are movable by a gas stream and are arranged at the edge as well as a number of support surfaces as a valve seat, having a number that corresponds to the number of the valve flaps, wherein each valve flap is adapted to a surface of a respective support surface. In addition, provisions are made for the support surfaces to be sloped in relation to a cross-sectional surface through the valve housing and for the support surfaces to form together a tip pointing in the flow direction of the directional valve.

The sloped support surfaces can geometrically be imaged to be in the form of a plurality of section planes through a cylinder, namely, each at the same level, at an equal angle and at uniformly spaced locations in the circumferential direction of the cylinder.

The slope of the support surfaces in relation to the cross-sectional surface through the valve housing means an oblique position of the support surfaces. In relation to a gas stream (or another flowing medium) in the flow direction through the directional valve, namely, through at least one respective opening in each support surface, the valve flaps, having a shape and an area that are adapted to the shape and area of the respective support surface, are located (upstream) on the support surfaces and are lifted by the gas stream (the particular medium), so that the directional valve opens. An area at which such a gas stream (medium) arrives first is called the "lower" area for a more readable description, but independently from an actual installation situation of the directional valve. An area upstream of the area at which the flow arrives first is correspondingly called "upper" area. The oblique position of the support surfaces means these rise beginning from a cross-sectional area located lower to above the plane with the cross-sectional area. A tip formed by the meeting support surfaces points in the flow direction of the directional valve and forms the point of the support surfaces located farther at the top (the highest point of the support surfaces). In case of a volume flow (gas or another medium) against the flow direction, the valve flaps are pressed by the volume flow onto the support surfaces and the opening or each opening is closed in this manner in each support surface of the respective valve flap, so that the directional valve closes.

The further description will be continued on the basis of a gas, for example, breathing gas, having a flow direction that is determined by means of the directional valve. Other fluids and other flowable media can always be used and are to be considered to be included in the description being presented here.

The advantage of such a directional valve is, based on the valve flaps being arranged at the edge of the valve housing, that in case of a gas flowing in the flow direction, the opening of the valve flaps takes place in the center of the directional valve and the resulting flow through the directional valve is not subject to any substantial change in direction due to the valve flaps. The above-described slope of the support surfaces in the direction of the gas stream facilitates the opening of the valve in the flow direction.

The above-mentioned adaptation of the valve flaps to the shape and area of the support surfaces does not mean that the valve flaps have the same shape and the same area as the support surface on which they lie when the directional valve is closed. The mentioned adaptation means that the shape of the valve flaps essentially follows the shape of the support surfaces and that the surfaces of the valve flaps are on the same order of magnitude as the surface of the support surfaces.

In one embodiment of the directional valve, each support surface is defined at the edge by a respective web that is common to an adjacent support surface, and all webs meet in the area of a central longitudinal axis of the directional valve and the point of the meeting forms the highest point of the tip pointing in the flow direction of the directional valve. In case of webs meeting in the area of the longitudinal axis, a pyramidal shape is obtained with a number of lateral surfaces, having a number that corresponds to the number of support surfaces, with at least two straight lateral surfaces enclosing a tip. In case of support surfaces that are pointed on at least one side, the valve flaps, which are adapted in terms of shape and area to the support surfaces, also taper in the direction of these tips and hence in the direction of the center of the valve housing. This means that each valve flap becomes increasingly narrower with increasing distance from the arrangement at the edge and it becomes increasingly mobile because of the resulting decrease in weight from one section to the next (steadily decreasing inertia). The valve flaps consequently open already in case of a low pressure in the flow direction, and the opening of the valve flaps increases steadily proportionally or at least essentially proportionally with increasing pressure in the flow direction.

The surfaces of all support surfaces are optionally of equal size and the surfaces of all valve flaps are likewise of equal size, so that a regular pyramidal shape is obtained, the regularity of the geometry guaranteeing the possibility of a uniform flow through the directional valve.

In another embodiment, the directional valve has three support surfaces and correspondingly three valve flaps. At least three support surfaces are necessary, but sufficient to obtain a geometry with the tip pointing in the flow direction of the directional valve.

In a special embodiment of the directional valve, the directional valve has a ring element, which can be combined with the valve housing, wherein all valve flaps are arranged at the edge of the ring element, and are especially in one piece with the ring element. Such a ring element facilitates the arrangement of the valve flaps on the valve housing and because all valve flaps are arranged on the ring element, all valve flaps are arranged on the valve housing simultaneously with the arrangement of the ring element on the valve housing.

In a preferred embodiment of a directional valve with a ring element, which ring element can be combined with the valve housing, the ring element is elastically deformable and can be detachably connected to the valve housing and is connected to the valve housing during the manufacture (installation) of the ring element by elastic deformation by the elastically deformable ring element being stretched and placed around the valve housing in the stretched state.

In another embodiment of a directional valve with an elastically deformable ring element, which ring element can be combined with the valve housing, the valve housing of the directional valve has, in its outer jacket surface a circumferential groove intended for receiving the ring element as well as at least one recess, which starts from the groove and is especially oriented parallel to the central longitudinal axis of the directional valve, while the ring element has a number of ribs, having a number that corresponds to the number of recesses and which is oriented fittingly to the orientation of the recesses. The groove intended for receiving the ring element guarantees a correct axial positioning of the valve flaps on the support surfaces. The rib or each rib, which is received by a recess in the outer jacket surface of the valve housing in a positive-locking manner (with a positive-lock), guarantees correct positioning of the valve flaps on the support surfaces in the circumferential direction of the valve housing. Consequently, the correct arrangement of the ring element in the groove in the valve housing and of the rib or each rib in a respective recess does alone guarantee the correct positioning of the valve flaps as intended. The directional valve is ready to use immediately after such an installation, and the ring element is placed in the groove in the outer jacket surface of the valve housing and each rib is placed in a respective recess with a method for manufacturing such a directional valve.

A special shape of the valve flaps is provided in a special embodiment of the directional valve. Each valve flap has the following properties here: Each valve flap is pointed in the direction of a central longitudinal axis of the directional valve and has borderline sections, which start from this tip and are straight in some sections. Furthermore, each valve flap has borderline sections following the contour of the valve housing in some sections on both sides of the connection at the edge, i.e., borderline sections that are arc-shaped in some sections in case of a cylindrical valve housing. Finally, each valve flap has an arc-shaped borderline each, inscribed into an acute angle, between the borderline sections starting from the tip and the borderline sections following the contour of the valve housing.

In cylindrical valve housing, the resulting shape can be briefly described most likely as being essentially triangular and having a tip as well as two "round corners". The "round corners," i.e., the arc-shaped borderline sections inscribed into an acute angle, are essential. The rounding at this point ("round corner") guarantees that a valve flap opening in a directional valve, in which the flow arrives in the flow direction, does not collide in the area of this "round corner" with the adjoining valve housing, at least not in a manner limiting the mobility of the respective valve flap with the adjoining inner surface of the valve housing.

In another special embodiment of the directional valve, the latter has, under the support surfaces, an especially honeycomb-like structure with guide surfaces oriented parallel to the central longitudinal axis of the valve housing. The structure, namely, its guide surfaces oriented parallel to the central longitudinal axis of the valve housing, guarantees homogenization of the gas stream passing through the directional valve in the flow direction and ensures essentially laminar flow through the directional valve.

In a special embodiment of a directional valve with such an especially honeycomb-like structure, this structure supports the support surfaces or parts of the support surfaces, especially in the area of the webs, for example, by the structure extending up to the underside of the support surfaces, especially by the structure being connected to the support surfaces on the underside of the support surfaces in one piece with the support surfaces, and thus it also acts as a support structure.

In yet another embodiment of a directional valve with such a structure (support structure), each support surface has a single, large-area opening, which can be closed by means of the respective valve flap, wherein the support structure also extends in the area of the opening, so that the valve flap lies in the unloaded state in an edge area on the support surface, on the one hand, and, on the other hand, on the support structure. The support structure is then supported not only on the support surfaces, but also on the valve flaps. This makes possible support surfaces with a single, large-area opening. As an alternative, it is also possible to use support surfaces with a plurality of smaller openings. The support surface itself supports the valve flap lying on the surface thereof and prevents sagging or turning over.

The use of a directional valve of the type being proposed here may be considered, for example, in a closed-circuit respirator or a closed-circuit diving apparatus, but also in medical devices, for example, a ventilator, an anesthesia apparatus or the like. Such devices will hereinafter generally be called devices for short. The present invention correspondingly also is such a device or a device having means for guiding and/or delivering a gas stream, especially a closed-circuit respirator, a closed-circuit diving apparatus or a medical device, with a directional valve of the type here and hereinafter described.

An exemplary embodiment of the present invention will be explained in more detail below on the basis of the drawings. Objects or components corresponding to one another are designated by the same reference numbers in all figures.

The exemplary embodiment shall not be considered to represent a limitation of the present invention. Also possible within the framework of the present invention are variations and modifications, especially variants and combinations that the person skilled in the art can arrive at, for example, by combining or varying individual features that are described in the general or special part of the description as well as contained in the claims and/or in the drawings in respect to the accomplishment of the object and that lead to a new subject through features that can be combined with one another. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
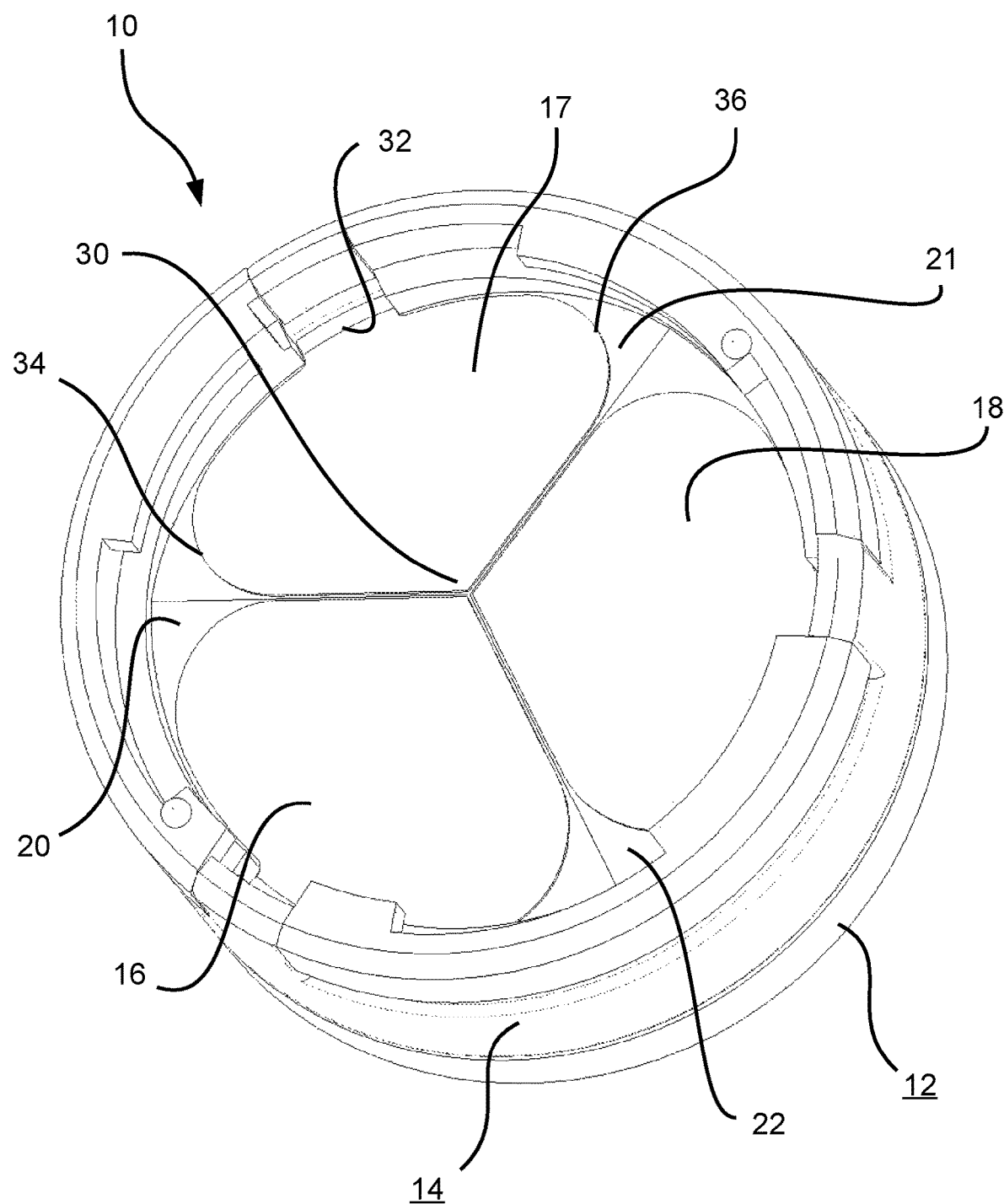
FIG. 1 is a perspective view of an embodiment of a directional valve according to the present invention.

Referring to the drawings, the view in FIG. 1 shows an embodiment of a directional valve 10 according to the invention in an isometric view. Thus, the directional valve 10 comprises a valve housing 12, especially a ring-shaped/cylindrical valve housing 12. The valve housing 12 can be connected, for example, to a breathing tube of a closed-circuit respirator or of a closed-circuit diving apparatus, neither of which is shown, and has for this basically optionally a profile for a bayonet-shaped connection of a breathing tube in an inner surface at both ends. In this or a similar manner, the valve housing 12 can be connected, as an alternative, to a tube, likewise not shown, of another device of the above-mentioned type. A pipe or the like or another hollow body intended for passing on gases may, of course, also be used instead of a tube.

An elastic ring element 14 can be connected to the valve housing 12. This ring element 14 has, in a symmetrical arrangement, movable valve flaps 16, 17, 18, which consist, for example, of a thin, flexible elastomeric material and together cover the inner cross-sectional surface of the valve housing 12. The embodiment being shown is formed by three valve flaps 16-18, and the symmetrical arrangement of these valve flaps means a distance of 120° each between the borderlines of two respective valve flaps 16-18 adjoining each other. More than three valve flaps 16-18 arranged symmetrically are also conceivable, in principle.

Figure 2:
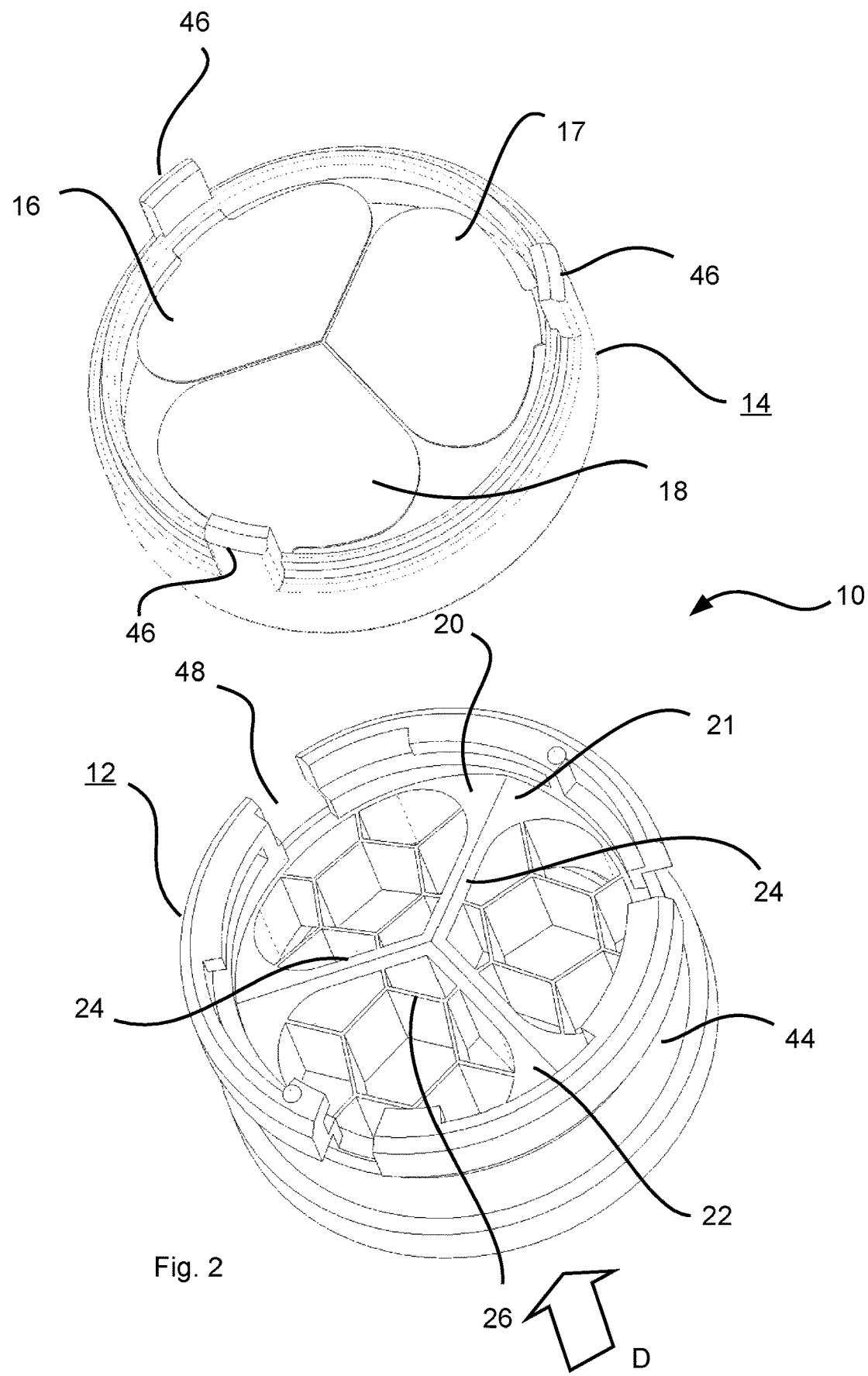
FIG. 2 is a perspective exploded view of the directional valve according to FIG. 1 with a valve housing and with a ring element that can be arranged on the valve housing.

The view in FIG. 1 shows a ready-to-use directional valve 10, in which the element 14 is connected to the valve housing 12. The valve flaps 16-18 are in contact with the surface of the valve housing 12 acting as a valve seat and the directional valve 10 is correspondingly closed. The view in FIG. 2 shows the valve housing 12 and the ring element 14 individually.

With the directional valve 10 closed, the valve flaps 16-18 are in contact with sloped support surfaces 20, 21, 22, which belong to the valve housing 12, act as a valve seat, can be better seen in the individual view of the ring element 14 and of the valve housing 12, and close one opening or optionally a plurality of openings in the support surface 20-22. Two adjacent support surfaces 20-22 each together a web 24 ending in the center of the valve housing 12, and three webs 24 with an angular distance of 120° are correspondingly obtained in case of three valve flaps 16-18.

The support surfaces 20-22 have at least one large-format opening or alternatively a plurality of openings, so that the total area of the openings of all support surfaces 20-22 is close to the total cross-sectional area of valve housing 12. An embodiment with a large-format opening each in each support surface 20-22 is shown in the view in FIG. 2, and a structure 26, which acts as a support structure and/or is intended for guiding and homogenizing a gas stream through the directional valve 10, can be seen under each opening.

In the embodiment shown with a ring-shaped valve housing 12 and with a ring element 14 with three valve flaps 16-18, each support surface 20-22 has an essentially triangular basic shape, and the edge pointing towards the edge of the valve housing 12 follows the contour of the valve housing 12 and is correspondingly arc-shaped. The individual large-area opening in each support surface 20-22 follows the triangular basic shape of the respective support surface 20-22, points in the direction of the meeting 24 of a tip, which webs define the respective support surface, and is rounded in the direction of the other two corners of the support surface 20-22 (the opening consequently has more or less the shape of a triangle with a tip, with a round edge located opposite the tip and with two "round corners" on both sides of the round edge).

Each valve flap 16-18 is adapted to the shape of the surface of its respective support surface 20-22 and the individual valve flaps 16-18 in the embodiment shown correspondingly have the same triangular shape with a tip, with a round edge and with two "round corners." Each valve flap 16-18 in the embodiment shown is characterized by three features: Each valve flap 16-18 is pointed in the direction of a central longitudinal axis of the directional valve 10 and has borderline sections, which start from the tip 30 (FIG. 1) and are straight in some sections. On both sides of a point, which is called an edge connection 32 (FIG. 1), at which the valve flaps 16-18 are arranged on the ring element 14 and are especially connected in one piece to the ring element 14, each valve flap 16-18 has, in some sections, borderline sections following the adjacent contour of the valve housing 12. Between the borderline sections starting from the tip 30 and the borderline sections following the contour of the valve housing 12, each valve flap 16-18 has an arc-shaped borderline section 34, 36 each, which is inscribed in an acute angle (FIG. 1). The arc-shaped borderline sections 34, 36 form the "round corners" of the valve flaps 16-18. The description of the shape of the valve flaps 16-18 also applies in the exemplary embodiment shown, aside from the edge connection 32, to the individual support surfaces 20-22 as well as to the respective one opening in each support surface 20-22.

Figure 3:
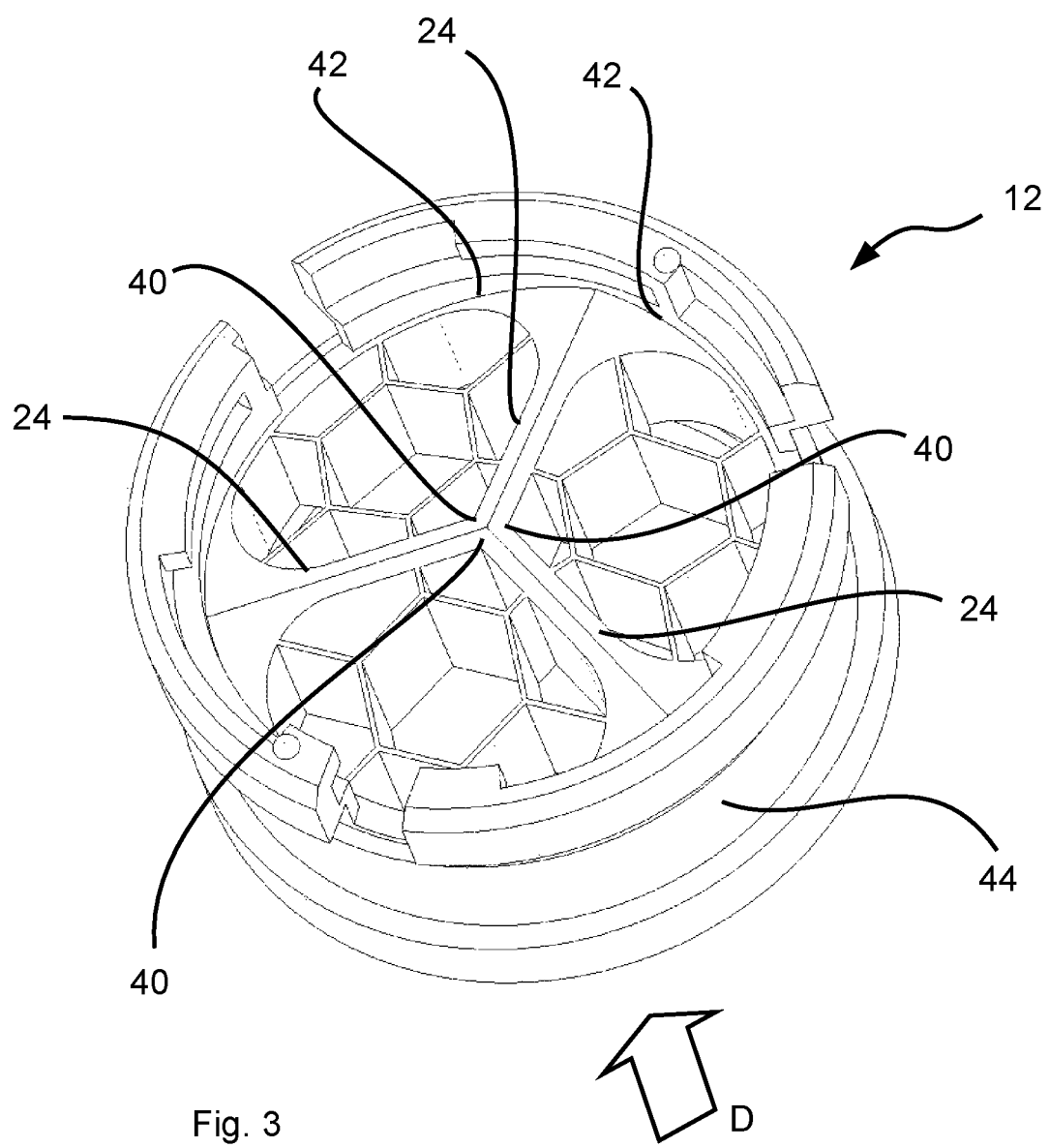
FIG. 3 is a perspective view of the valve housing individually.

The support surfaces 20-22 are sloped in relation to an imaginary cross-sectional surface through the valve housing 12. To explain this slope, the valve housing 12 from FIG. 2 is shown in FIG. 3, but it is shown without a complete repetition of the reference numbers used there, using additional reference numbers, instead.

The slope of the support surfaces 20-22 means that the inner (centrally located) corners 40, at which two webs 24 each meet, do not lie in the same plane as the edges 42 pointing towards the edge of the valve housing 12. Each support surface 20-22 is flat.

During installation, the valve housing 12 is oriented corresponding to the intended flow direction. The flow direction D for the orientation of the valve housing 12 shown in FIG. 2 and in FIG. 3 is illustrated by means of the block arrow shown there. As can be seen, the inner corners 40 of the support surfaces 20-22, at which two webs 24 each meet, are located upstream of the edges 42 of the support surfaces 20-22, which edges point towards the edge of the valve housing 12, and of the (outer) corners located there. This facilitates the opening of the directional valve 10 when the flow arrives at the valve flaps 16-18 in the flow direction shown. A gas stream against the flow direction shown presses, by contrast, the valve flaps 16-18 onto the support surfaces 20-22, so that the openings in the support surfaces 20-22 are covered (closed) by means of the valve flaps 16-18 and the directional valve 10 closes with certainty in case of such a flow direction.

If the position of the inner corners 40 of the support surfaces 20-22, at which two webs 24 each meet, is referred to in the interest of a simple description as "top" and a position of a plane (cross-sectional surface) with the "lowest" points of the edges 42 of the support surfaces 20-22, which edges point towards the edge of the valve housing 12, is referred to as "bottom," it is justified to use the description according to which the sloped orientation of the support surfaces 20-22 means that these rise upwards starting from a lower cross-sectional surface and form together an ("upwardly" pointing) tip pointing in the flow direction of the directional valve. "Bottom" and "top" are also correlated with the flow direction of a gas stream through the opened directional valve 10. The gas stream 10 first reaches the directional valve 10 at the bottom and flows out of same at the top. The support surfaces 20-22 are thus also sloped in the direction of a flow direction D of the directional valve 10 (from "bottom" to "top"). "Bottom" and "top" are not used to designate have nothing to do with a particular installation position of the directional valve 10.

The support surfaces 20-22 belonging to the valve housing 12 are made, for example, integrally in one piece with the valve housing 12, by the valve housing 12 being manufactured together with the support surfaces 20-22 as a plastic part in the same manufacturing process (for example, by injection molding) or being suitably connected to the valve housing 12, for example, by bonding, forming integrally or the like.

In the special embodiment of the directional valve 10 shown in the figures, the directional valve has in the valve housing 12, basically optionally, the above-mentioned structure 26. The structure 26 is honeycomb-shaped in the embodiment shown.

The structure 26 is effective for the homogenization of a gas stream passing through an opened directional valve 10 (the valve flaps 16-18 is now lifted off from the support surfaces 20-22) and comprises for this guide surfaces oriented parallel to the central longitudinal axis of the valve housing 12. In a honeycomb-like structure 26, each edge surface of a honeycomb acts as a guide surface oriented parallel to the central longitudinal axis of the valve housing 12.

Figure 4:
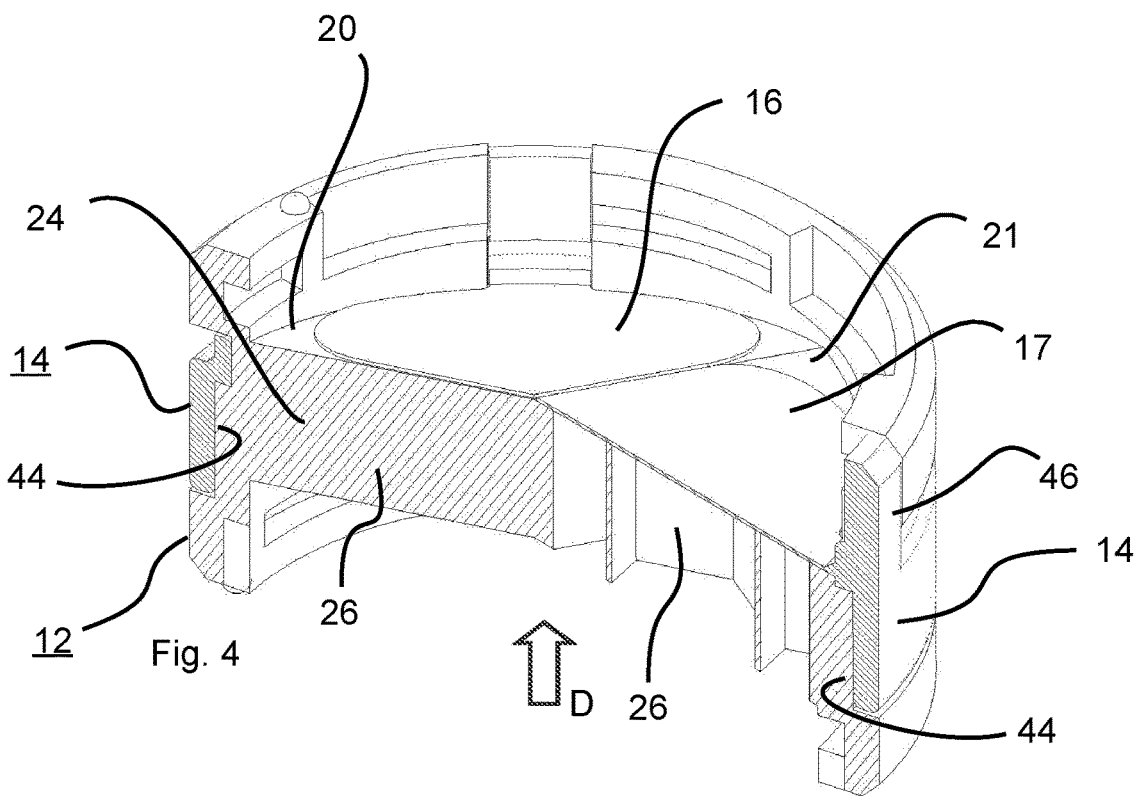
FIG. 4 is a perspective longitudinal sectional view through the directional valve according to FIG. 1.
Figure 5:
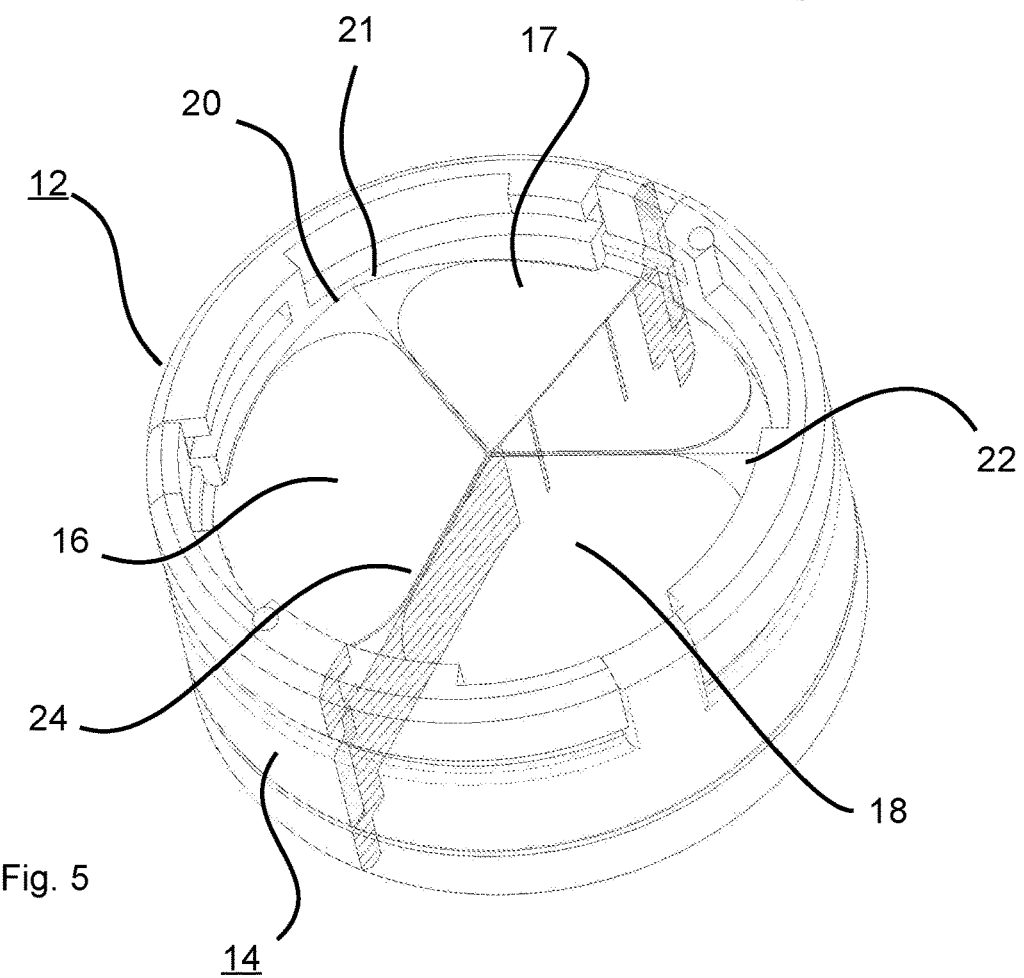
FIG. 5 is a perspective partially sectional and phantom view of the directional valve according to FIG. 1 showing the section plane shown in FIG. 4.

The view in FIG. 4 shows a longitudinal section through the directional valve 10, and the course of the section plane is shown in FIG. 5 in the directional valve 10, which is shown otherwise completely. The section plane extends through the webs 24 and centrally divides the valve flap 17, which is located opposite the two valve flaps 16, 18 adjoining the cut web 24. It can be seen in the view above all that the structure 26 comprises the webs 24 and reaches the valve flaps 16-18 in the support surfaces 20-22 in the area of the openings in the support surfaces 20-22 as well. The structure 26 thus also acts as a support structure for the support surfaces 20-22 as well as the valve flaps 16-18 and prevents the valve flaps 16-18 from sagging in the unloaded state as well as the valve flaps 16-18 from turning over in case of a gas stream against the flow direction D and thus guarantees that the directional valve 10 with its valve flaps 16-18 and support surfaces 20-22 can also withstand a high back pressure.

In the special embodiment of the directional valve 10 shown in the figures, the ring element 14 can be detachably connected to the valve housing 12. The ring element 14 is elastically deformable for this such that the diameter of the ring element 14 can be temporarily widened and the ring element 14 can be pulled over the outer jacket surface of the valve housing to receive the ring element 14, the valve housing 12 has a circumferential groove 44 (FIG. 2, FIG. 4) in its outer jacket surface. The ring element 14 undergoes an elastic reverse deformation after the end of the widening and is in contact in the groove the section of the outer surface of the valve housing 12, which section is located there. The arrangement of the ring element 14 in the groove 44 guarantees a correct "vertical" orientation of the ring element 14 (along the central longitudinal axis of the valve housing 12) and of the valve flaps 16-18 arranged thereon in relation to the support surfaces 20-22 of the valve housing 12. At least one rib 46 or a plurality of ribs 46 (FIG. 2), which mesh with recesses 48 provided for this purpose (FIG. 2) in the valve housing 12, is/are provided on the ring element 14 for the correct orientation of each valve flap 16-18 in the circumferential direction of the valve housing 12. In the embodiment of the directional valve 10 shown in the figures, the valve housing 12 has three recesses 48, which are located at uniformly spaced locations in the circumferential direction and are oriented parallel to the central longitudinal axis of the directional valve 10. The ring element 14 has a corresponding number of ribs 46, which are located at uniformly spaced locations in the circumferential direction of the ring element 14 and are likewise oriented parallel to the central longitudinal axis of the directional valve 10. The installation of the directional valve 10 is considerably simplified and correct positioning of the valve flaps 16-18 in relation to the support surfaces 20-22 is guaranteed by these positioning aids (groove 44; rib(s) 46 and recess(es) 48). In the embodiment shown, the ring element 14 comprises, corresponding to the number of valve flaps 16-18, three ribs 46, which are located equidistantly in the circumferential direction, with each rib 46 adjoining in the radial direction the edge connection 32 (FIG. 1) of a valve flap 16-18 on the ring element 14. The thickness of the material in the area of the edge connection 32 determines a prestress of the valve flaps 16-18 for the closed state of the directional valve 10, and a suitable material thickness in this area as well as further in the direction of the tip 30 (FIG. 1) permits the installation of the directional valve 10 in any desired orientation.

Figure 6:
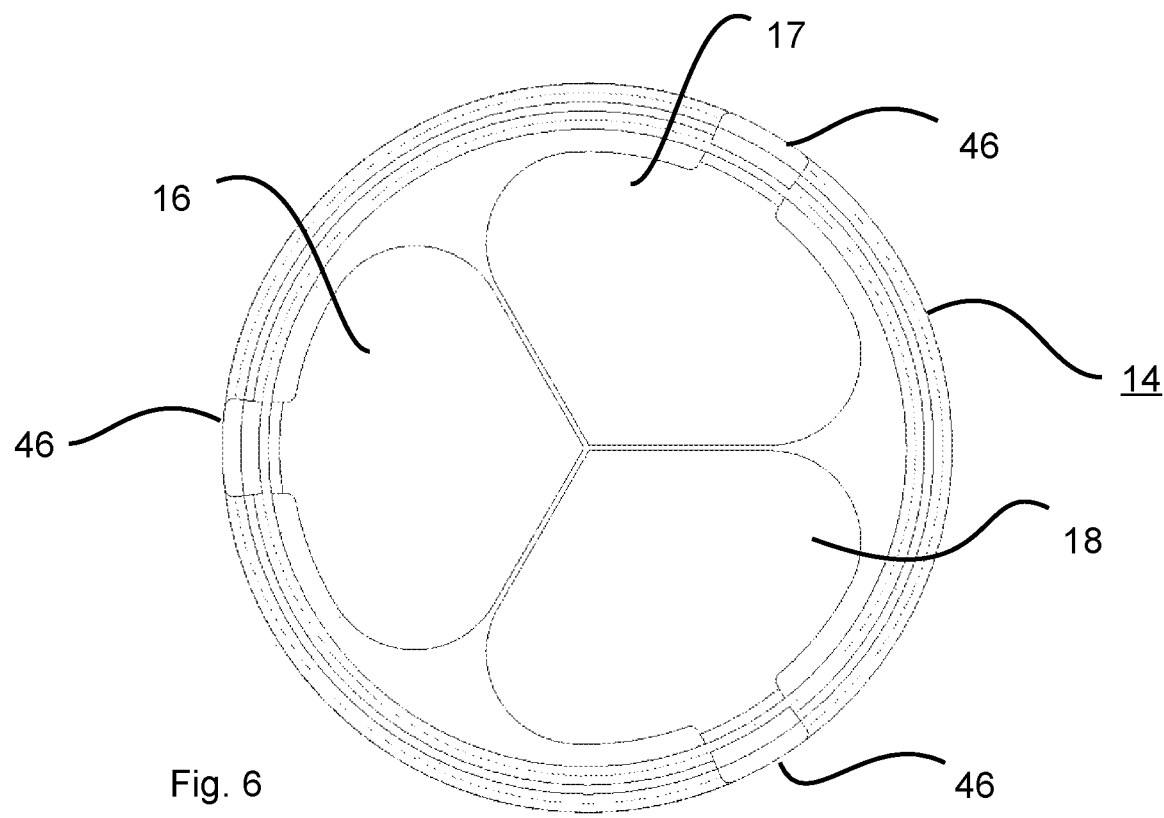
FIG. 6 is a top view showing the ring element.
Figure 7:
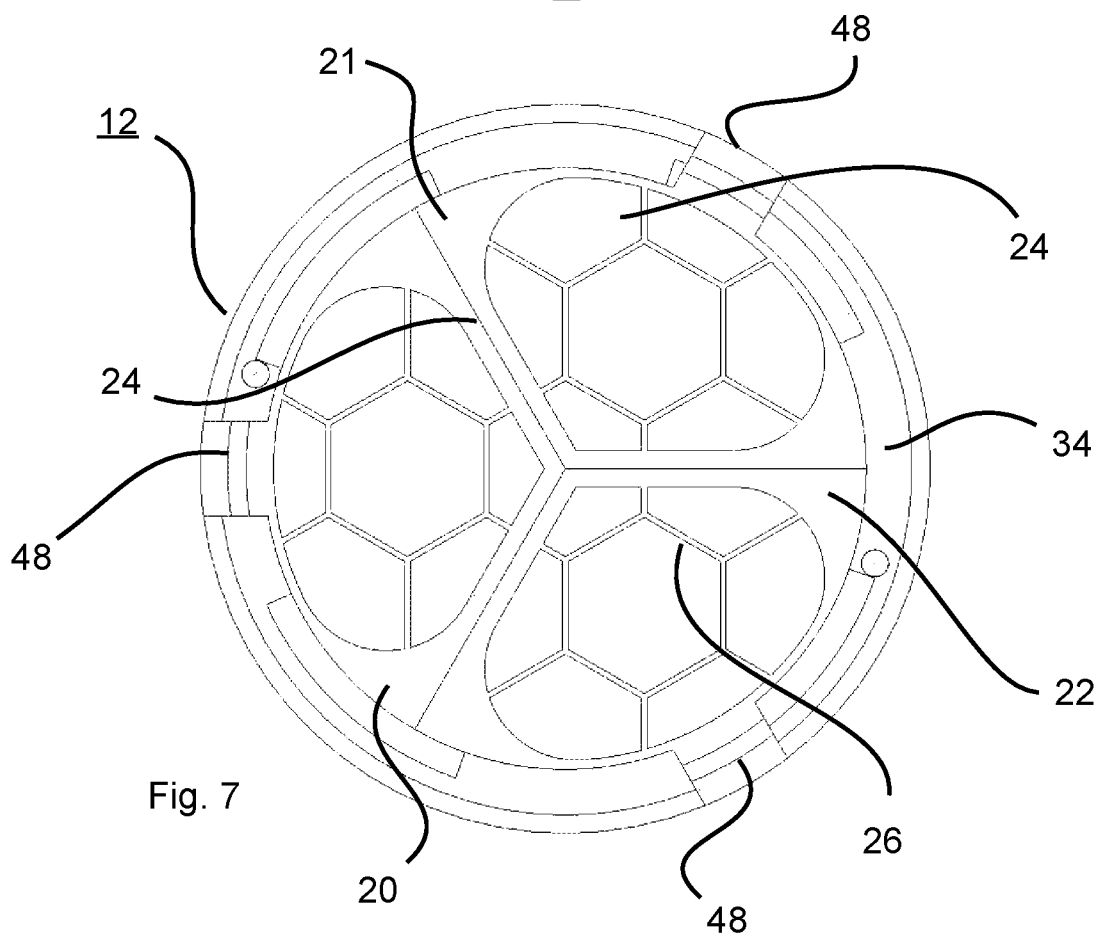
FIG. 7 is a top view of the valve housing.

The views in FIG. 6 and FIG. 7 finally show the ring element 14 with the flaps 16-18 arranged thereon well as the valve housing 12 with the support surfaces 20-22 and with the structure 26 in a top view. The valve housing 12 and the ring element 14 have basically optionally a one-piece configuration in the embodiment of the directional valve 10 shown. The valve housing 12 and the ring element 14 are manufactured, for example, by injection molding, the ring element 14 by an injection molding method, in which the material used vulcanizes with thermal treatment.

Individual aspects of the description being presented here, which are in the foreground, can thus be briefly summarized as follows: Proposed are a directional valve 10 with a valve housing 12, with a plurality of valve flaps 16-18, which can be moved by a gas stream or by a flowing medium and are arranged at the edge, as well as with a number of support surfaces 20-22 as a valve seat, having a number that corresponds to the number of valve flaps 16-18, wherein each valve flap 16-18 is adapted to a surface of a respective support surface 20-22, wherein the support surfaces 20-22 are sloped in relation to a cross-sectional surface through the valve housing 12 and wherein the support surfaces 20-22 form together a tip pointing in the flow direction D of the directional valve 10; a method for manufacturing such a directional valve 10 as well as the use of such a directional valve 10.

While specific embodiments of the invention have been shown and described in detail to illustrate the application of the principles of the invention, it will be understood that the invention may be embodied otherwise without departing from such principles.

What is claimed is:

1. A gas stream delivery device comprising a closed-circuit respirator, a closed-circuit diving apparatus or a medical device, the gas stream delivery device further comprising a directional valve comprising:
   a valve housing;
   a plurality of valve flaps, which can be moved by a flowing medium and are arranged at an edge of the valve;
   a plurality of support surfaces defining a valve seat, wherein a number of the support surfaces corresponds to a number of the valve flaps, each valve flap is adapted to a surface of a respective one of the support surfaces and the support surfaces are sloped in relation to a cross-sectional surface through the valve housing and the support surfaces together form a tip pointing in a flow direction of the directional valve; and
   a ring element, which can be combined with the valve housing, wherein the valve flaps are arranged on the ring element at an edge thereof, wherein:
   the ring element comprises an elastically deformable ring element, which is detachably connected to the valve housing;
   the valve housing has an outer jacket surface with a circumferential groove intended for receiving the ring element and the outer jacket surface of the valve housing has one or more recesses, the one or more recesses start from the groove in the outer jacket surface of the valve housing;
   the ring element has one or more ribs, wherein a number or ribs corresponds to a number of recesses; and
   each of the one or more recesses receives a respective one of the one or more ribs with a positive-lock.

2. A gas stream delivery device in accordance with claim 1, wherein:
   the support surfaces are disposed adjacent to each other as adjacent support surfaces;
   each support surface is defined at an edge by an associated respective web, and each web is shared in common by two of the adjacent support surfaces; and
   all webs meet in a meeting area of a central longitudinal axis of the directional valve and the meeting area forms a most extended point of the support surfaces in the flow direction of the directional valve.

3. A method for manufacturing a directional valve, the method comprising the steps of:
   providing a valve housing;
   providing a plurality of valve flaps, which can be moved by a flowing medium;
   arranging the plurality of valve flaps at an edge of the valve; and
   providing a plurality of support surfaces, defining a valve seat, at the valve housing, wherein a number of the support surfaces corresponds to a number of the valve flaps, each valve flap is adapted to a surface of a respective one of the support surfaces and the support surfaces are sloped in relation to a cross-sectional surface through the valve housing and the support surfaces together form a tip pointing in a flow direction of the directional valve, wherein the directional valve is further provided with an elastically deformable ring element, which is detachably connected to the valve housing and further comprising arranging the valve flaps on the ring element at an edge thereof and connecting the elastically deformable ring element to the valve housing by stretching the elastically deformable ring element and placing the stretched elastically deformable ring element around the valve housing in the stretched state.

4. A method in accordance with claim 3, wherein:
the support surfaces are disposed adjacent to each other as adjacent support surfaces;
each support surface is defined at an edge by an associated respective web, and each web is shared in common by two of the adjacent support surfaces of the support surfaces; and
all webs meet in a meeting area of a central longitudinal axis of the directional valve and the meeting area forms a most extended point of the support surfaces in the flow direction of the directional valve.

5. A method in accordance with claim 3, wherein the valve housing has an outer jacket surface with a circumferential groove intended for receiving the ring element and the outer jacket surface of the valve housing has one or more recesses, the one or more recesses start from the groove in the outer jacket surface of the valve housing, the ring element has one or more ribs, a number or ribs corresponds to a number of recesses each of the one or more recesses receives a respective one of the one or more ribs with a positive-lock, and the ring element is placed in the groove in the outer jacket surface of the valve housing and each rib is placed into a respective recess.

6. A directional valve comprising:
a valve housing;
a plurality of valve flaps, which can be moved by a flowing medium and are arranged at an edge of the valve;
a plurality of support surfaces defining a valve seat, a number of the support surfaces corresponds to a number of the valve flaps, wherein each valve flap is adapted to a surface of a respective one of the support surfaces and the support surfaces are each sloped in relation to a cross-sectional surface through the valve housing and the support surfaces together form a tip pointing in a flow direction of the directional valve;
a ring element, which can be combined with the valve housing, wherein the valve flaps are arranged on the ring element at an edge thereof, wherein the ring element comprises an elastically deformable ring element, which is detachably connected to the valve housing, wherein:
the valve housing has an outer jacket surface with a circumferential groove intended for receiving the ring element and the outer jacket surface of the valve housing has one or more recesses, the one or more recesses start from the groove in the outer jacket surface of the valve housing;
the ring element has one or more ribs, wherein a number or ribs corresponds to a number of recesses; and
each of the one or more recesses receives a respective one of the one or more ribs with a positive-lock.

7. A directional valve comprising:
a valve housing;
a plurality of valve flaps, which can be moved by a flowing medium and are arranged at an edge of the valve; and
a plurality of support surfaces defining a valve seat, a number of the support surfaces corresponds to a number of the valve flaps, wherein each valve flap is adapted to a surface of a respective one of the support surfaces and the support surfaces are each sloped in relation to a cross-sectional surface through the valve housing and the support surfaces together form a tip pointing in a flow direction of the directional valve, wherein:
each valve flap has an edge connection with the housing; and
each valve flap is pointed in a direction of a central longitudinal axis of the directional valve and has tip extending borderline sections, which start from the tip and are straight in some sections, has housing contour borderline sections, which each follow the contour of the valve housing, on one of two sides of the respective edge connection, and has arc-shaped borderline sections, which are each inscribed into an acute angle, between a respective one of the tip extending borderline sections and a respective one of the housing contour borderline sections.

8. A directional valve in accordance with claim 7, wherein:
the surfaces of all support surfaces are of equal size; and
the surfaces of all valve flaps are of equal size.

9. A directional valve in accordance with claim 7, wherein:
the plurality of support surfaces consists of three support surfaces; and
the plurality of valve flaps consists of three valve flaps.

10. A directional valve in accordance with claim 7, further comprising a guide surface structure under the support surfaces with guide surfaces oriented parallel to a central longitudinal axis of the valve housing.

11. A directional valve in accordance with claim 10, wherein the guide surface structure supports the support surfaces.

12. A directional valve in accordance with claim 10, wherein the guide surface structure comprises a honeycomb structure.

* * * * *